United States Patent [19]
Ogilvie

[11] Patent Number: 6,138,200
[45] Date of Patent: Oct. 24, 2000

[54] SYSTEM FOR ALLOCATING BUS BANDWIDTH BY ASSIGNING PRIORITY FOR EACH BUS DURATION TIME SLOT TO APPLICATION USING BUS FRAME AND BUS DURATION

[75] Inventor: Clarence R. Ogilvie, Huntington, Vt.

[73] Assignee: International Business Machines Corporation, Armonk, N.Y.

[21] Appl. No.: 09/094,084

[22] Filed: Jun. 9, 1998

[51] Int. Cl.[7] .......................... G06F 13/14; G06F 13/372
[52] U.S. Cl. ........................ 710/244; 710/117; 710/112
[58] Field of Search ................................ 710/124, 127, 710/45, 113, 117, 128, 123, 244, 264, 112, 107

[56] References Cited

U.S. PATENT DOCUMENTS

| | | | |
|---|---|---|---|
| 5,109,490 | 4/1992 | Arimilli et al. ........................... | 710/110 |
| 5,111,424 | 5/1992 | Donaldson et al. ...................... | 710/117 |
| 5,377,332 | 12/1994 | Entwistle et al. ........................ | 710/117 |
| 5,430,848 | 7/1995 | Waggener ................................. | 710/123 |
| 5,490,253 | 2/1996 | Laha et al. ................................ | 710/124 |
| 5,533,205 | 7/1996 | Blackledge, Jr. et al. ............... | 710/117 |
| 5,546,567 | 8/1996 | Nakamura ................................. | 713/501 |
| 5,574,951 | 11/1996 | Sawyer et al. ............................ | 710/45 |
| 5,621,898 | 4/1997 | Wooten ..................................... | 710/117 |
| 5,878,236 | 3/1999 | Kleineberg et al. ..................... | 710/128 |
| 5,894,562 | 4/1999 | Moyer ...................................... | 710/113 |
| 5,951,554 | 9/1999 | Lambrecht et al. ...................... | 710/124 |
| 5,999,999 | 12/1999 | Homitsu et al. ......................... | 710/127 |

*Primary Examiner*—Meng-Ai T. An
*Assistant Examiner*—Jungwon Chang
*Attorney, Agent, or Firm*—Schmeiser, Olsen & Watts; Robert A. Walsh

[57] ABSTRACT

A system and method for arbitrating amongst a plurality of applications requesting bus access. Based on the applications requesting bus access, a bus frame is calculated, and a plurality of bus duration time slots within the bus frame are determined. For each bus duration time slot, a priority is assigned to each application requesting bus control and a bus allocation table is created. A bus master controller then allocates control during each bus duration time slot in accordance with the priorities in the bus allocation table.

10 Claims, 3 Drawing Sheets

SYSTEM FOR ALLOCATING BUS BANDWIDTH BY ASSIGNING PRIORITY FOR EACH BUS DURATION TIME SLOT TO APPLICATION USING BUS FRAME AND BUS DURATION

BACKGROUND OF THE INVENTION

1. Field of the Invention

The present invention relates generally to computer bus architectures, and more specifically to a system and method for optimizing bus priority for real time applications.

2. Related Art

In digital computer systems having a plurality of applications, such as processor applications, controller applications, communication interface applications, real time applications, etc., a medium is employed whereby these applications can transfer data to each other. Typically, the medium employed is a physical data channel known as a bus. The bus is connected to a communications port associated with each application. In typical data bus architectures, information is conveyed over the bus in discrete packets (e.g., words). However, since there are multiple applications sharing the same bus, the applications must contend for bus access each time data is to be transferred. Most bus architectures include a bus controller for arbitrating access to the bus.

Temporally, the bus is divided into a series of time slots known as bus cycles. A bus cycle is the period of time for which an application is granted access to the bus. Most bus system architectures use a "fixed priority" as the basis for determining what application has control of the system bus. In such systems, each application requesting bus access has a predetermined priority level that is analyzed by the bus controller for determining access to the bus during a particular bus cycle. Accordingly, a fixed high priority application is granted control over the bus prior to a fixed low priority application. Thus, a fixed high priority application can monopolize the system bus, locking out other applications. This type of architecture makes the inclusion of multiple real time applications (e.g., music, video, telephone, etc.) very difficult and can cause the real time applications to fail during critical time periods (i.e., periods when multiple high priority applications require bus access).

Most fixed high priority applications are categorized as deterministic, since it is known ahead of time how often (i.e., how frequently or periodically) the bus must be accessed (hereinafter referred to as the "application frame"), and what duration (i.e., amount of time) is required during each application frame (hereinafter referred to as the "application duration"). Unfortunately, present systems provide no means for handling critical time periods on a bus with multiple applications that utilize fixed priority systems. Without a system for managing time bus arbitration systems which control critical time periods used in the arbitration schemes based on the particular applications that are running, the inclusion of multiple real time applications within a single system architecture will be difficult to achieve.

SUMMARY OF THE INVENTION

The present invention provides a system and method for optimizing bus priority for systems having multiple fixed priority applications. The method allocates bus bandwidth to a plurality of applications requesting bus access wherein each of the applications has a known application frame and a known application duration, the method generally including the steps of:

1) determining a bus frame, wherein the bus frame equals the smallest application frame for those applications requesting bandwidth;
2) calculating a bus duration for each application, and creating a bus duration time slot during the bus frame for each application;
3) for each bus duration time slot, assigning a priority to each application; and
4) arbitrating the bus by processing the bus frame, including sequentially processing each bus duration time slot and granting bus access to the highest priority application that is ready to transfer data.

The bus duration for each application is determined by the following formula:

$$\text{bus duration} = \frac{\text{application duration}}{(\text{application frame}/\text{bus frame})}$$

Similarly, a system for allocating bus bandwidth to a plurality of applications requesting bus access is also provided and generally comprises:

1) a mechanism for determining a bus frame;
2) a mechanism for calculating a bus duration for each application;
3) a mechanism for constructing a bus allocation table, wherein the bus allocation table includes a bus duration time slot for each application, and each bus duration time slot includes a priority level for each of the applications; and
4) a priority encoder, wherein the priority encoder determines bus access based upon the bus allocation table.

Further features and advantages of the present invention, as well as the structure and operation of various embodiments of the present invention are described in detail below with reference to the accompanying drawings.

DETAILED DESCRIPTION OF THE PREFERRED EMBODIMENTS

Figure 1:
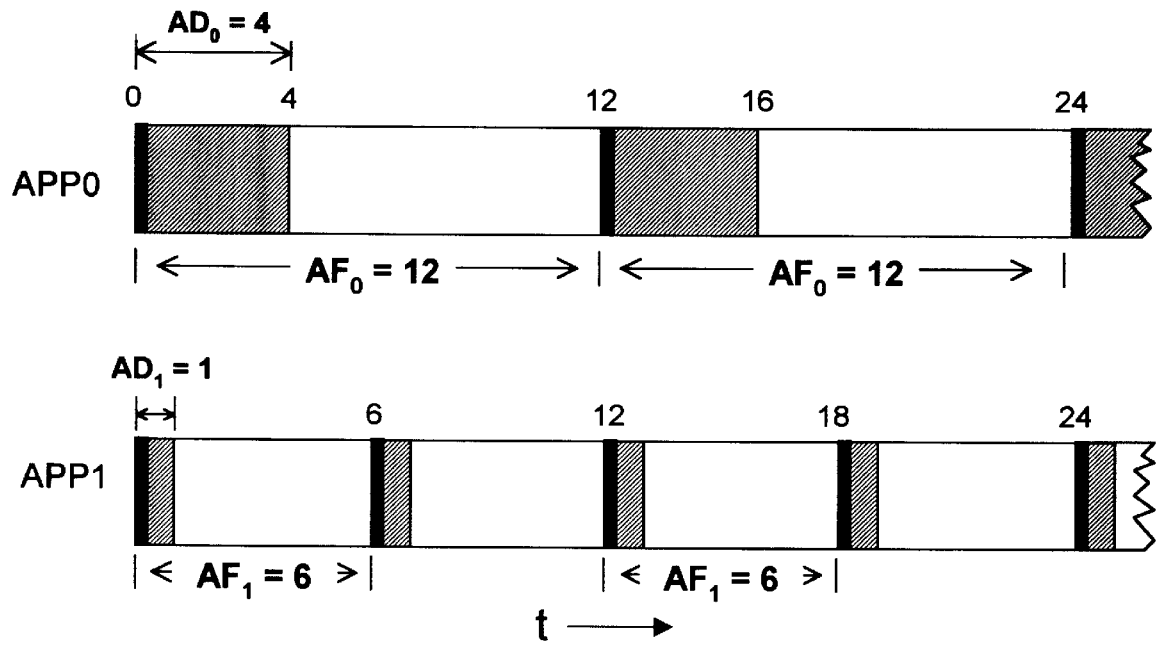
FIG. 1 depicts the general timing requirements for a first and second application.
Figure 2:
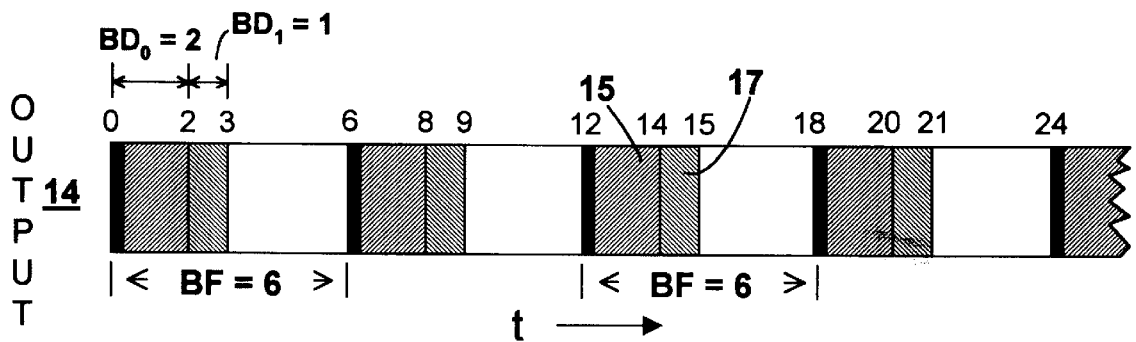
FIG. 2 depicts an arbitration scheme for the two applications of FIG. 1 determined in accordance with a preferred embodiment of the present invention.

Referring now to the drawings, FIGS. 1 and 2 are used to describe the process of analyzing applications requesting bus access to determine a "bus frame," and to create "bus duration time slots" within the bus frame. FIG. 1 depicts the bus requirements for two applications, APP0 and APP1. Each application has a known application frame that is defined as the minimum period during which the application must perform a data transfer operation. In this example, APP0 has an application frame $AF_0$ that is equal to 12 time units and APP1 has an application frame $AF_1$ equal to six time units. In addition, each application has a known application duration, wherein the application duration is defined as the amount of time it takes an application to perform a function within the application frame. According to FIG. 1, APP0 has an application duration $AD_0$ equal to four time units and APP1 has an application duration $AD_1$ of one time unit. Therefore, APP0 is required to perform a data transfer operation every 12 time units and within that time requires four time units in which bus control is required to transfer data. In a similar manner, APP1 is required to perform a data transfer operation every 6 time units and within that time requires one time unit in which bus control is required to transfer data. It is understood that although the application frame and application duration for each application is fixed, the time during which the data is transferred during the application frame may vary. In other words, the to transferring of data during the application frame can occur at the beginning of the application frame (as shown in FIG. 1), at the end of the application frame, or in the middle of the application frame. Moreover, the outputting of data during each application frame need not be contiguous. Rather, it may be broken into multiple discrete pieces separated by periods of time when the application does not have control of the bus. The critical requirement for each application is that the application be granted enough time during each application frame to transfer its data.

FIG. 2 depicts a timing diagram depicting the resultant bus allocation for an arbitration of APP0 and APP1 of FIG. 1 in accordance with the present invention. According to the output 14 shown in FIG. 2, bus duration time slots 15 and 17 have been created based on the known application information from APP0 and APP1 of FIG. 1. The bus duration time slots 15 and 17 of FIG. 2 may be calculated by a task processor within the bus controller as follows. First, a bus frame "BF" is determined as being the minimum time period needed to manage the bus and is equal to the smallest application frame for all applications requesting bus access. In this case, the bus frame is equal to six (BF=6), which equals the application frame of APP1 ($AF_1$) shown in FIG. 1. Next, a bus duration is calculated for each application. The bus duration is calculated as follows:

$$BDn = \frac{ADn}{(AFn/BF)}.$$

The bus duration BDn represents the time allotted to the nth application to transfer its data within the bus frame BF such that the nth application will meet its bus time constraints. According to the above formula, the bus duration for APP0 ($BD_0$) is equal to two, while the bus duration for APP1 ($BD_1$) is equal to one. Note that if the sum of all bus durations (i.e., $BD_0+BD_1+\ldots$) is greater than the bus frame, then the system would shut down due to the fact that the system resources have been exceeded. Otherwise, bus arbitration can proceed.

Once the bus durations $BD_0$ and $BD_1$ are determined, bus duration time slots 15 and 17 can be assigned within the bus frame. The bus duration time slots 15 and 17 do not represent exclusive time slots for the associated applications, but rather represent time slots that can be made available to any one of the applications requesting bandwidth in a prioritized manner. In the preferred embodiment, the application associated with the bus duration time slot will receive the highest priority during the bus duration time slot. For example, bus duration time slot 15 is associated with application APP0 of FIG. 1 and therefore APP0 will be given the highest priority during the time slot 15. However, if for any reason APP0 is not ready to transfer data during the bus duration time slot 15, APP1 will be given control of the bus. Similarly, during bus duration time slot 17, APP1 of FIG. 1 will be given highest priority. This process is described with a more detailed example in FIG. 3.

Figure 3:
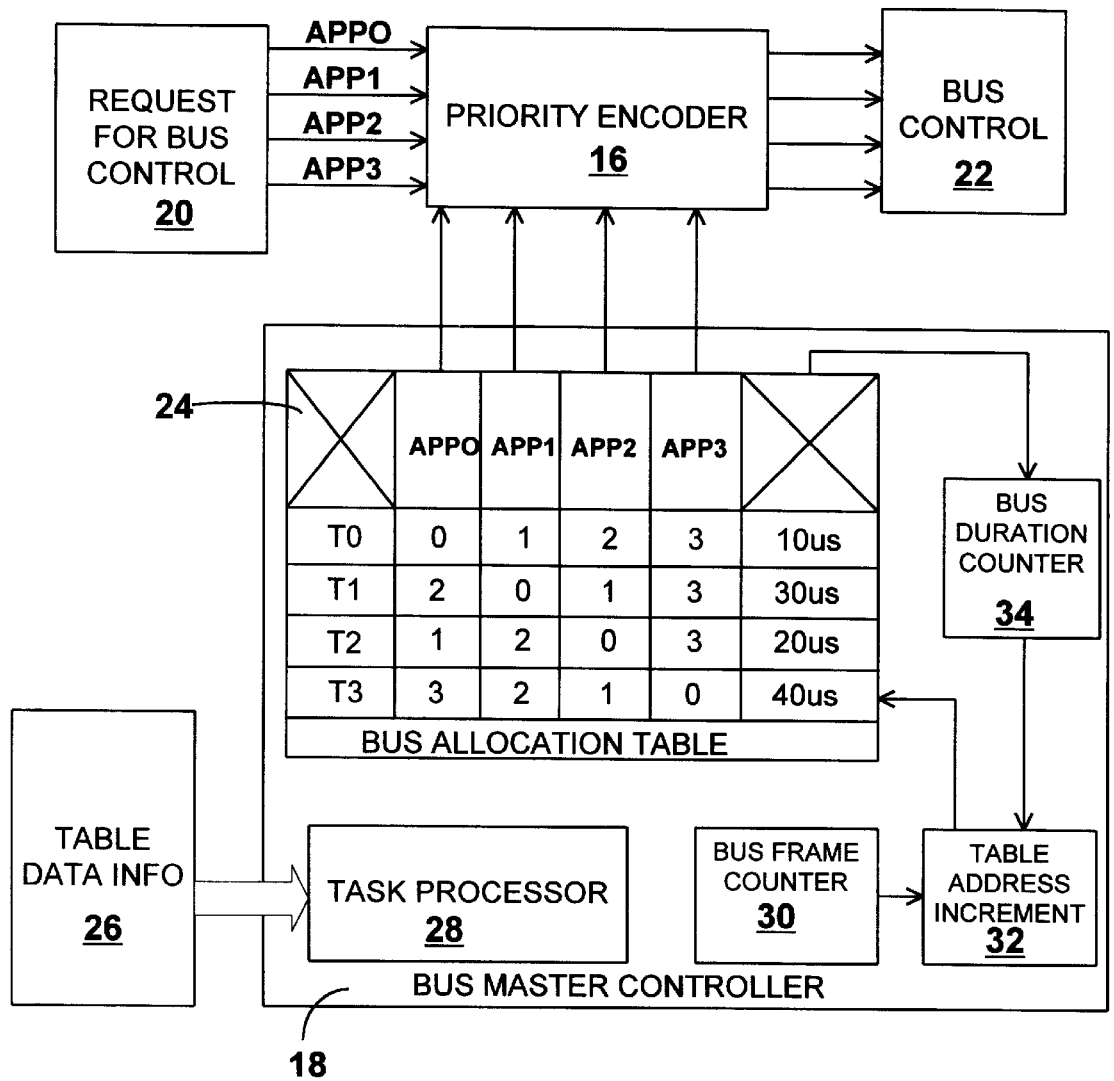
FIG. 3 depicts a bus master controller block diagram in accordance with a preferred embodiment of the present invention.

FIG. 3 depicts a bus master controller 18 that is in the process of arbitrating amongst four applications APP0, APP1, APP2 and APP3. (It should be recognized that any number of applications can be arbitrated by the described system, and FIG. 3 is merely one example of the arbitration process.) In accordance with the discussion above, a bus allocation table 24 is created by a task processor 28, based on table data information 26 supplied by application drivers when each of the applications APP0, APP1, APP2 and APP3 are invoked. Table data information 26 may include application frame and application duration data for each application. It may also include information that can be used to establish relative priorities among the applications.

In general, the bus allocation table 24 determines bus allocation during each bus frame. Any time the bus frame is altered (such as when a new application requests access to the bus) a new bus allocation table 24 will need to be created. The bus allocation table 24 lists along a first axis (column or row) of a matrix each application requiring bus access, and lists along a second axis (column or row) of a matrix each bus duration time slot. The data within the table indicates the relative priority of each application for each time slot. Priorities can be determined in any manner, so long as each application is guaranteed adequate access at some point during the bus duration. As can be seen in the bus allocation table 24, four bus duration time slots T0-T3 have been created for the four applications APP0–APP3 needing bus access in the current bus frame. Within each bus duration time slot, each application is assigned a relative priority. For example, in the T0 bus duration time slot, APP0 is assigned a priority of 0, APP1 is assigned a priority of 1, APP2 is assigned a priority of 2, and APP3 is assigned a priority of 3.

Bus duration time slots T0–T3 have fixed bus durations of 10 μs, 20 μs and 40 μs, determined in accordance with the procedures detailed in FIGS. 1 and 2. In operation, bus duration counter 34 cycles through each of the bus duration time slots T0–T3, causing each time slot to be sequentially processed by the priority encoder 16. For each time slot, the priority encoder 16 grants bus control 22 to the "appropriate" application (i.e., the highest priority application that is ready to transfer data, where 0 represent the highest priority). Thus, for the first time slot T0, the priority encoder 16 offers first priority to the bus to APP0 (priority=0). If APP0 is not ready to transfer data, second priority is given to APP1 (priority=1), etc. After the first bus duration time slot finishes (i.e., after 10 μs expires), the bus duration counter 34 increments to the second bus duration time slot T1, and the process is repeated. In the case of T1, APP1 has the highest priority, followed by APP2, APP0, and APP3. In the case of T2, APP2 has highest priority, followed by APP0, APP1, and APP3. In the case of T3, APP3 has highest priority, followed by APP2, APP1, and APP0. Once all of the bus duration time slots have been processed, the bus frame counter 30 increments the table address increment 32 to the next bus frame, and the process is repeated.

Figure 4:
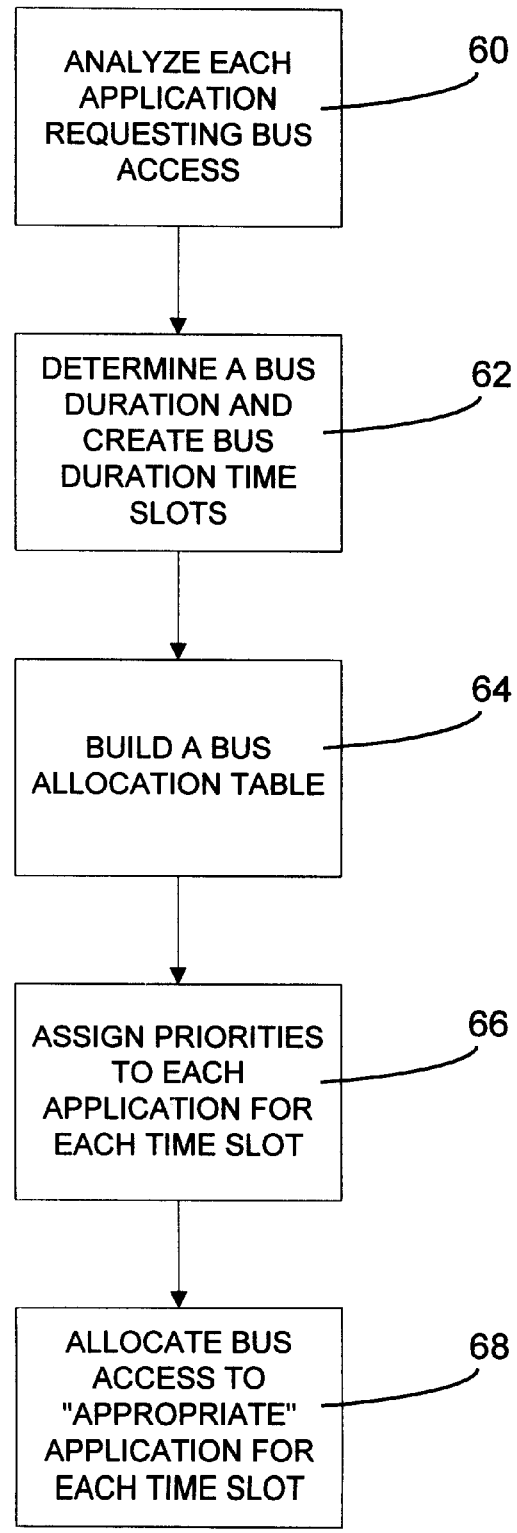
FIG. 4 depicts a flow diagram of the arbitration method in accordance with a preferred embodiment of the present invention.

FIG. 4 summarizes the steps involved in arbitrating bus requests from a plurality of applications. Arbitration includes the steps of analyzing 60 each of the applications requesting bus access to determine 62 a bus duration and bus duration time slots, building a bus allocation table 64 that includes each of the applications along a first axis and each of the bus duration time slots along a second axis, assigning priorities 66 to each application for each bus duration time slot, sequentially processing each bus duration time slot, and allocating bus access 68 to the appropriate application for each time slot.

While various embodiments of the present invention have been described above, it should be understood that they have been presented by way of example only and not limitation. Thus, the scope of the present invention should not be limited by any of the above-described exemplary embodiments but should be defined only in accordance with the following claims and their equivalents.

What is claimed is:

1. A method for allocating bus bandwidth to a plurality of applications requesting bus access, wherein each application has a known application frame, wherein the application frame is defined as a minimum period in which an application must perform an operation, and a known application duration, wherein an application duration is defined as the amount of time it takes the application to perform the operation within the application frame, the method comprising the steps of:

determining a bus frame, wherein the bus frame equals the smallest application frame for those applications requesting bandwidth;

calculating a bus duration for each application;

creating a bus duration time slot during the bus frame for each application;

for each bus duration time slot, assigning a priority to each application; and arbitrating the bus by processing the bus frame, including sequentially processing each bus duration time slot and granting bus access to the highest priority application that is ready to transfer data.

2. The method of claim 1, wherein each application is given highest priority during the application's associated bus duration time slot.

3. The method of claim 1, wherein the bus duration is calculated as follows:

$$\text{bus duration} = \frac{\text{application duration}}{(\text{application frame}/\text{bus frame})}.$$

4. The method of claim 1, further comprising the step of aborting the bus frame processing step if a sum of all bus durations is greater than the bus frame.

5. A system for allocating bus bandwidth to a plurality of applications requesting bus access, wherein each application has a known application frame, wherein the application frame is defined as a minimum period in which an application must perform an operation, and a known application duration, wherein an application duration is defined as the amount of time it takes the application to perform the operation within the application frame, the system comprising:

a mechanism for determining a bus frame, wherein the bus frame equals the smallest application frame for those applications requesting bandwidth;

a mechanism for calculating a bus duration for each application;

a mechanism for constructing a bus allocation table, wherein the bus allocation table includes a bus duration time slot for each application, and each bus duration time slot includes a priority level for each application; and a priority encoder, wherein the priority encoder determines bus access based upon the bus allocation table.

6. The system of claim 5, further comprising a mechanism for sequentially processing each of the bus duration time slots in the bus allocation table.

7. The system of claim 5, wherein the bus duration is calculated using the following formula:

$$\text{bus duration} = \frac{\text{application duration}}{(\text{application frame}/\text{bus frame})}.$$

8. A bus master control system for arbitrating a bus amongst a plurality of applications, comprising:

a bus allocation table for holding priority information for each of a plurality of bus duration time slots within a bus frame, wherein the bus allocation table includes a first axis of a matrix for representing the bus duration time slots and a second axis of a matrix for representing each of the applications; and a bus master controller, wherein the bus master controller sequentially processes each of the bus duration time slots from the bus allocation table to determine relative priorities for each of the applications during each of the bus duration time slots.

9. The bus master control system of claim 8, wherein each bus duration time slot represents a bus duration for one of the applications, wherein the bus duration is determined as follows:

$$\text{bus duration} = \frac{\text{application duration}}{(\text{application frame}/\text{bus frame})}.$$

10. The bus master control system of claim 8, further comprising a priority encoder for receiving bus access requests, and for granting bus control based upon the processing of the bus master controller.

* * * * *